April 19, 1932.  C. F. JOHNSON  1,854,197
VALVE CONSTRUCTION
Filed May 24, 1929

Inventor
Chester F. Johnson
by Charles W. Hills
Attys.

Patented Apr. 19, 1932

1,854,197

UNITED STATES PATENT OFFICE

CHESTER F. JOHNSON, OF DETROIT, MICHIGAN

VALVE CONSTRUCTION

Application filed May 24, 1929. Serial No. 365,702.

This invention relates to an improved form of valve construction suitable for flap or gate valves and the like, but has special reference to an improved and simplified construction of an air valve for carbureters of internal combustion engines.

In the general type of carbureter to which this valve has been shown as applied to, the valve must not only lie free, flat and true on its seat, but must have certain dimensions held to close limits. On account of unavoidable manufacturing variations in the valves and carbureter, it frequently requires individual alignment of the valve, as an example the valve might bear on either the heel or toe, or on one side or the other, or it might seat properly, but be off center. It is accordingly an object of this invention to provide a construction of air valve that can be cheaply manufactured and readily bent or twisted until it is true on its seat without distorting the valve in places other than those locations especially shaped to facilitate the alignment of the valve.

Other and further important objects of this invention will be apparent from the disclosures in the specification and the accompanying drawings.

This invention (in a preferred form) is illustrated in the drawings and hereinafter more fully described.

Figure 1:
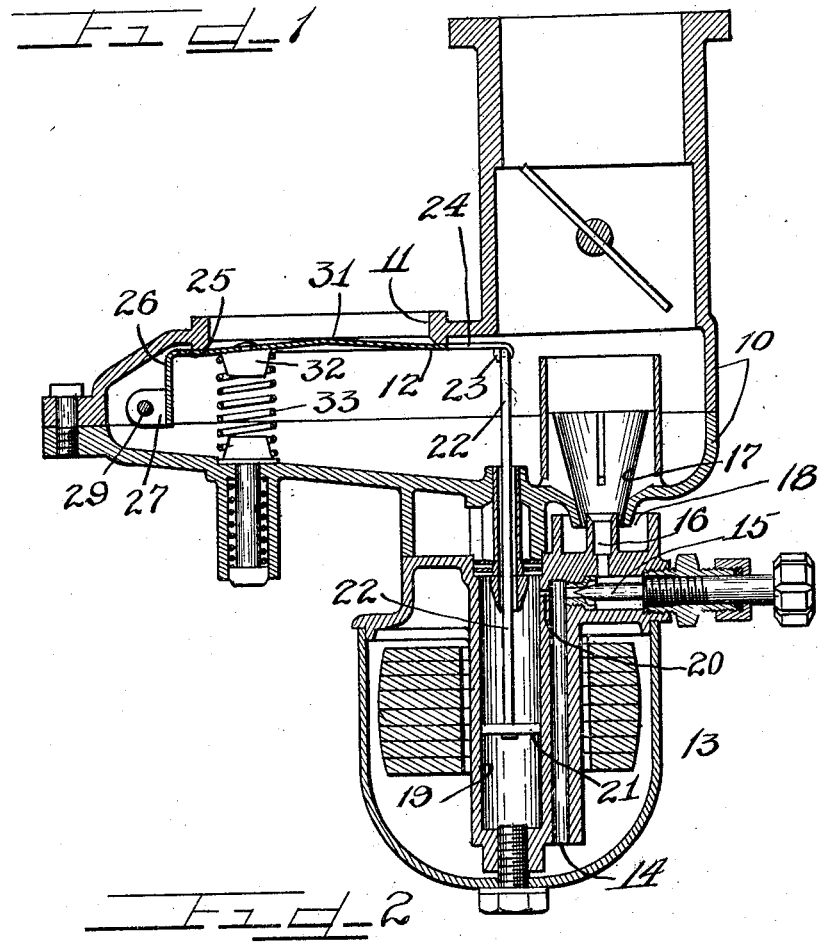
Figure 1 is a vertical section through a carbureter containing an air valve embodying the features of this invention.
Figure 2:
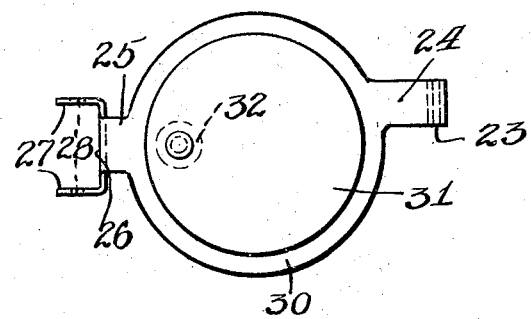
Figure 2 is a plan view of the air valve.

As the present invention relates to a particular construction of valve per se the chosen embodiment in a complete carbureter in Figure 1 needs but a brief description. The carbureter comprises a two part body 10 containing an air inlet port 11 normally closed by a valve 12 forming the subject matter of this invention. A float bowl 13 is mounted below the body 10 and delivers fuel through a vertical passage 14 to a needle valve 15 and thence to a nozzle 16 positioned at the throat of a Venturi or mixture passage 17 which draws in outside air through the cup like member 18. A stabilizer well 19 is filled from the float bowl through a port 20 and contains a stabilizer plate 21 having a rod 22 connecting to an eye 23 formed on an extension 24 of the valve 12, the arrangement being such that the opening of the valve 12 depresses the plate 21 and thereby produces a dash pot effect which prevents the flutter of the air valve.

The valve 12 is designed as a sheet metal stamping with an integral lug 25 in the plane of the valve which is bent downwardly at 26 and has ears 27 which are pierced at 28 to pivot on a pivot pin 29 in the carbureter body. The pivot is necessarily at a predetermined and closely regulated distance from the air valve seat and the desired axis of the stabilizer rod 22 so that because of manufacturing tolerances required in sheet metal work, the valve is located by its annular face portion 30 and the eye 23 on the extension 24 and then the ears are drilled at the proper position rather than to attempt to punch them during the blanking operation.

The valve is dished as at 31 inside the annular face portion in order to stiffen the face, and is provided with a stud 32 forming a pilot for a spring 33 which normally closes the valve.

In use it has been found that due to variations in the limits of manufacture of the carbureter body as well as the valve stamping, an individual alignment of the valve is often required. If the valve bears on its heel or toe the lug 25 can be bent to obtain proper valve seating. If the valve bears on one side or the other the portion 25 of the lug can be twisted. Similarly, if the valve lies flat on its seat, but is off center to one side or the other the portion 26 can be twisted to obtain alignment. In each case such bending or twisting of the lug 25 and 26 can take place without distorting the valve at any other place both because of the form of the lug and the stiffening of the center of the valve due to the dished form thereof. Due to this method of manufacturing this valve, the locating points of the valve may easily be held to close limits and require very little additional individual fitting, which may easily be done without distorting the valve, the valve itself being practically unbreakable.

It will thus be seen that I have provided an improved form of pivoted or flap valve that is simple to manufacture and assemble and can readily be adjusted to compensate for unavoidable manufacturing variations in either the valve or the seat therefor.

I am aware that many changes may be made, and numerous details of construction may be varied through a wide range without departing from the principles of this invention, and I, therefore, do not purpose limiting the patent granted hereon, otherwise than necessitated by the prior art.

I claim as my invention:

A pivoted valve comprising a sheet metal stamping forming a valve face and having oppositely disposed outstanding lugs, one lug being formed with an eye and the other being bent at right angles and having outstanding ears integral therewith, said ears being apertured to form pivot bearings at a fixed position relative to the valve face and the eye in said first mentioned lug.

In testimony whereof I have hereunto subscribed my name at Chicago, Cook County, Illinois.

CHESTER F. JOHNSON.